July 2, 1929.  C. M. HIBBETS  1,719,368
GEAR SHIFT LEVER
Filed Aug. 31, 1927  2 Sheets-Sheet 1

Charles M. Hibbets.
INVENTOR.
By John B. Thomas Co.
ATTORNEYS.

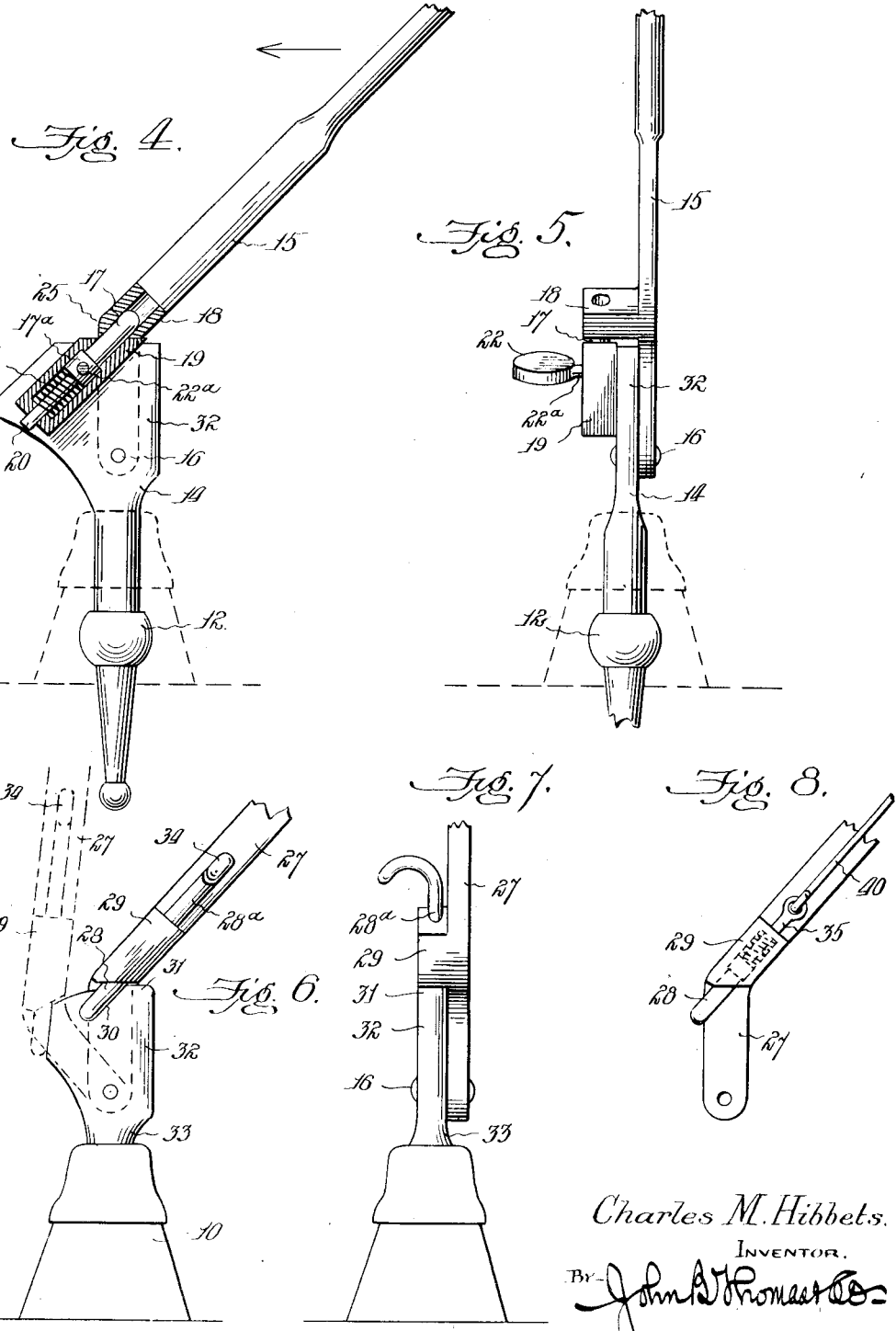

Patented July 2, 1929.

1,719,368

UNITED STATES PATENT OFFICE.

CHARLES MICHAEL HIBBETS, OF CLAUDE, TEXAS.

GEAR-SHIFT LEVER.

Application filed August 31, 1927. Serial No. 216,657.

My invention is an improvement in gear-shift levers used in connection with the operation of automobiles.

The shifting lever for operating the selective sliding gear transmission of an automobile is located at the right-hand side of the driver and projects upwardly and rearwardly from the floor alongside of the driver's legs thus obstructing the passageway should the driver desire to leave the automobile at the right hand side of the same, and as State laws and city ordinances require an automobile to be driven and stopped at the right-hand side of a street or roadway it is of course safer for the driver to get out at the right hand side of the automobile rather than the other side in the way of moving traffic, but as the gear-shift lever obstructs the passageway to the right it is more convenient and therefore the practise to leave, as well as enter, the automobile at the left-hand side of the same.

The primary object of my invention therefore is to provide a gear-shift lever which may be easily and conveniently moved forward so as to leave a clear passageway for the driver to get in or out of the automobile at the right-hand side thereof, the construction of the lever to provide for moving it beyond the range of movement provided for shifting the transmission gears being such that the rigidity of the lever is not affected to impair its operation in shifting the gears.

A further object of my invention is to provide a gear-shift lever for automobiles that not only provides an unobstructed passageway for the driver but also provides that said lever may be conveniently locked, with the transmission gears in neutral position, to thereby prevent the automobile being driven by an unauthorized person.

Other objects and advantages of my invention will be apparent from the following description of the construction and operation of my improved gear-shift lever, and what I claim as new and desire to fully protect by Letters-Patent is set forth in the appended claims.

In the accompanying drawings:

Fig. 4 is an enlarged side view, partly in section.

Fig. 5 is a rear view of the gear-shift lever.

Figs. 6 and 7 are a modification in the arrangement of the bolt and keeper.

Fig. 8 illustrates a further modification.

Figure 1:
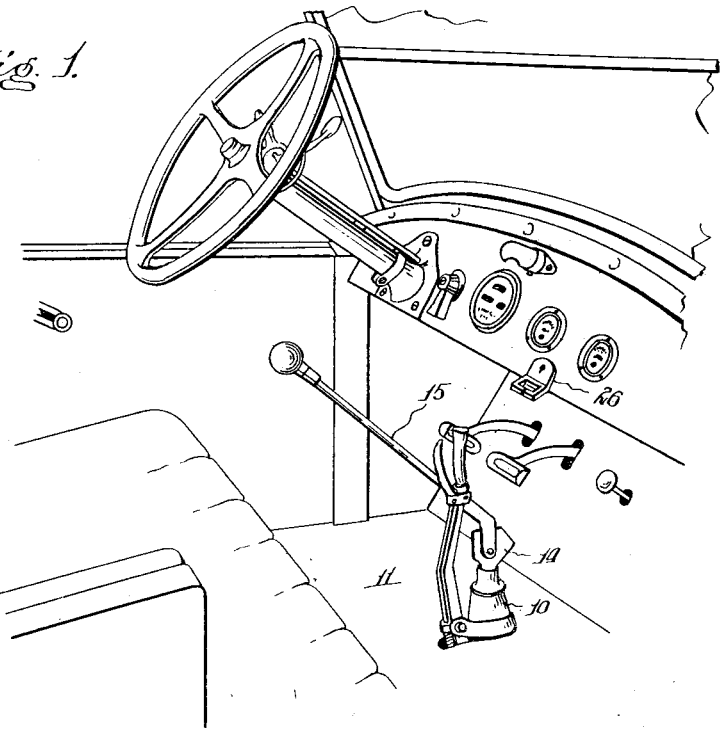
Figure 1 is a perspective view of a part of an automobile to show the application of my invention.

For convenience of illustration my invention is shown applied to a conventional type of gear-shift lever mounted in a housing 10 on the floor 11 of the automobile and has a ball 12 seated in the housing for universal movement of the lever in operating the ordinary type of selective sliding gear transmission, but in carrying out my invention the gear-shift lever is in two sections 14 and 15, pivoted together at 16 above the housing so that the upper or handle section 15 may be moved forward out of the way for the driver to pass in getting into and out of the automobile from the right-hand side of the same, suitable means being provided for locking the movable handle section in operative position as well as in forward position with the sliding gear transmission in neutral to prevent the automobile being operated by an unauthorized person and thus protect it against theft.

Figure 2:
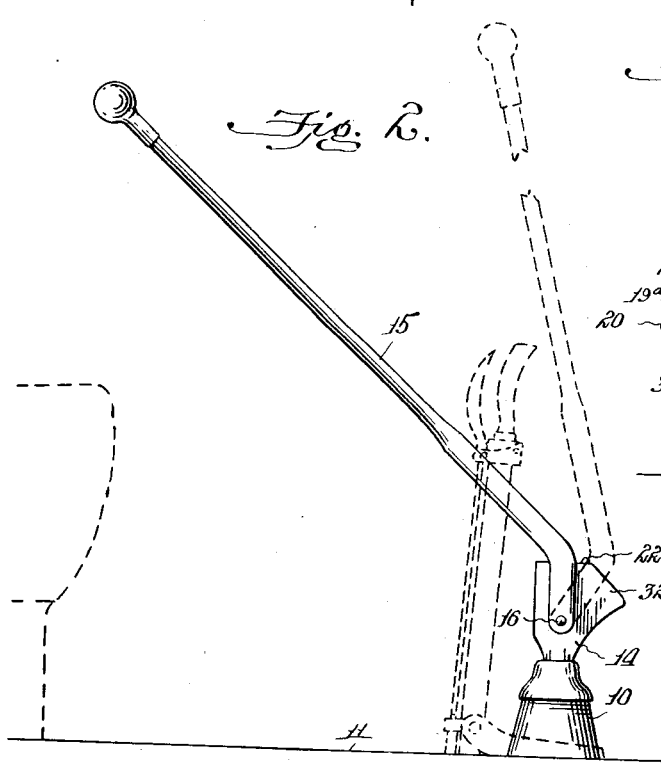
Fig. 2 is a side view of the gear-shift lever embodying my invention and showing the preferred form of construction.
Figure 3:
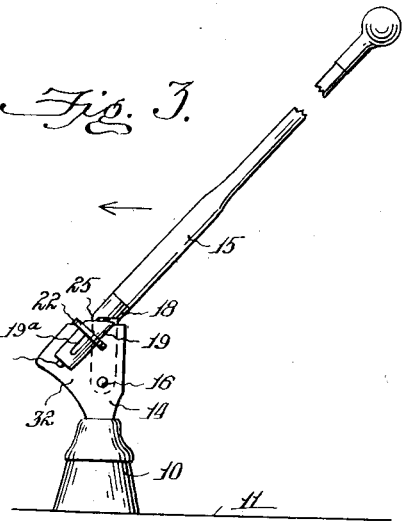
Fig. 3 is a side view opposite that shown in Fig. 2.

Various means may be provided for locking the lever sections on a line with each other for the operation of the sliding gears in the usual manner, as for instance the locking device or joint shown in Figs. 1 to 5, inclusive, wherein the section or rocking head 14 is provided with a sliding-bolt 17 engaging a lug or keeper 18 on the section 15, said bolt being slidable in a casing 19 secured to or formed integrally with said lever section or head and having a stem 20 around which an expansion spring 21 is coiled and interposed between an enlarged portion 17ª of the bolt and lower end wall of the casing for projecting the bolt upwardly in engagement with the lug or keeper on section 15. For retracting the bolt by pressure of the driver's foot the enlarged portion 17ª thereof is provided with a foot-piece 22 connected by shank 22ª extending through slot 19ª in the bolt-casing. The outer end of the spring bolt is rounded or tapered so that it may be readily moved into the lug or keeper by spring pressure, as the lever sections are brought in alinement with each other, and the lug or keeper 18 is provided with a projecting wall 25 at one side of the bolt receiving recess therein for the bolt to strike against the limit its rearward movement with respect to the companion lever section 14, the movement of lever section 15 in the forward direction—when its rigidity is broken—being limited by contact with a fixed part of the automobile, as the instrument board. In the operation of this form of the invention the two jointed sections of the gear-shift lever are securely connected together by the sliding-bolt and keeper on the respective sections, these parts being of sufficient strength to provide a rigid gear-shift lever for the operation of the transmission gears, and when it is desired to move the handle-section out of the way for unobstructed passageway to the right it is only necessary to push down on the foot-piece 22 thus releasing the bolt for free movement of said handle-section towards the front of the automobile or against the instrument board where it may be held by a suitable lock, indicated by the numeral 26.

Instead of having the sliding-bolt on the lower section of the gear-shift lever to engage a keeper on the upper section, as hereinfore described, the sliding-bolt may be mounted on the upper section 27 in Figs. 6 and 7, in this instance the sliding-bolt 28 projecting from the lower end of the casing 29 to engage a notch 30 in the upper edge of the lower section 33 of the lever for rigidly joining said sections for the operation of the transmission gears, and when the lever is moved forward the spring-actuated bolt is projected in front of the lower section, as indicated in dotted lines in Fig. 6.

It will be noted that in each instance the upper part of the lower section of the gear-shift lever is flattened in the form of a plate 32, to either carry the spring-actuated bolt or provide for the notch when the spring-actuated bolt is carried by the upper section, and it will be also noted that in the latter instance, or when the bolt is on the movable upper section to engage a notch in the lower section, that portion, 31, of the edge of the plate back of the notch is higher than the forward part to facilitate the entrance of the bolt into the notch, as well as to serve as a stop or buffer.

When the spring-actuated sliding bolt is located on the upper section of the gear-shift lever it may be retracted either by means of a finger-hold 34 formed by bending the projecting shank 28ª or by means of a rod 40 (Fig. 8) extending upward alongside of the upper member of the gearshift lever and connected to a hand-operated crank (not shown) such as ordinarily employed for operating a pawl.

From the foregoing description it will be understood that the upper section of the gear-shift lever is thrown forward to be out of the way when the transmission gears are in neutral position, and consequently said gears cannot without difficulty be operated until said lever section is brought in alinement with the sliding bolt in engagement with the keeper, thus providing for locking the gear-shift lever out of position for the operation of the transmission gears as well as out of the way so that the driver may conveniently enter or leave the automobile at the right hand side of the same or away from moving traffic.

A gearshift lever constructed as herein shown and described provides an unobstructed passageway in front of the driver's seat of an automobile, and is more especially desirable in connection with automobiles in which the driver sits at the left-end of the front seat inasmuch as it permits him to enter and leave the automobile at the right hand side of the same or at the curb alongside of which he is required to stop the automobile in complying with the usual State laws and city ordinances, but even in those localities or countries in which automobiles are driven on the left-hand side of the roadway it will be convenient to install the improved gear-shift lever in that it provides for an unobstructed passageway in front of the driver's seat so that the passenger sitting with the driver may leave and enter the automobile away from moving traffic, and in both instances the arrangement provides a means for locking the car against theft.

I claim:

1. A gear-shift lever for automobiles comprising a lower lever-section having a member of the universal joint formed thereon and flattened at its upper end in the form of a plate, and an upper lever-section pivoted at its lower end to one side of the flattened portion of the lower lever section and bent at an obtuse angle at the upper edge of said lower lever section; together with a bolt-casing formed on one of the lever-sections, a spring-actuated bolt slidable in said casing, a lug on the other lever-section having an opening to receive the bolt, and means for operating the bolt against the spring.

2. A gear-shift lever for automobiles comprising a lower lever-section having a member of the universal joint formed thereon and flattened at its upper end in the form of a plate, with a bolt-casing formed integrally with the plate at the upper end thereof, and an upper lever-section pivoted at its lower end to one side of the flattened portion or plate of the lower lever-section and bent at an obtuse angle at the upper end of the latter, the upper portion of said last mentioned lever-section having an apertured lug formed thereon in line with the aforesaid bolt-casing; together with a spring-actuated bolt in the bolt-casing, and a foot-piece projecting from the bolt for operating the same against the action of the spring.

CHARLES MICHAEL HIBBETS.